United States Patent
Berger et al.

(10) Patent No.: US 9,704,137 B2
(45) Date of Patent: Jul. 11, 2017

(54) SIMULTANEOUS EDITING/ACCESSING OF CONTENT BY COLLABORATOR INVITATION THROUGH A WEB-BASED OR MOBILE APPLICATION TO A CLOUD-BASED COLLABORATION PLATFORM

(71) Applicant: Box, Inc., Los Altos, CA (US)

(72) Inventors: Jonathan Berger, Los Altos, CA (US); Nick Rolph, Los Altos, CA (US); Brandon Savage, San Carlos, CA (US)

(73) Assignee: Box, Inc., Redwood City, CA (US)

( * ) Notice: Subject to any disclaimer, the term of this patent is extended or adjusted under 35 U.S.C. 154(b) by 360 days.

(21) Appl. No.: 14/027,149

(22) Filed: Sep. 13, 2013

(65) Prior Publication Data

US 2015/0082195 A1    Mar. 19, 2015

(51) Int. Cl.
*G06Q 10/10* (2012.01)
*G06F 3/0484* (2013.01)
*H04L 29/06* (2006.01)

(52) U.S. Cl.
CPC ......... *G06Q 10/101* (2013.01); *G06F 3/0484* (2013.01); *H04L 65/403* (2013.01)

(58) Field of Classification Search
CPC .... G06Q 10/101; G06F 3/0484; H04L 65/403
See application file for complete search history.

(56) References Cited

U.S. PATENT DOCUMENTS 5,301,348 A * 4/1994 Jaaskelainen ....... G06F 3/04817
345/469.1

5,576,946 A * 11/1996 Bender ............ G05B 19/41865
700/17

(Continued)

FOREIGN PATENT DOCUMENTS

| CA | 2724521 | 11/2009 |
|---|---|---|
| CN | 101997924 A | 3/2011 |

(Continued)

OTHER PUBLICATIONS

"Conceptboard", One-Step Solution for Online Collaboration, retrieved from websites http://conceptboard.com and https://www.youtube.com/user/ConceptboardApp?feature=watch, printed on Jun. 13, 2013, 9 pages.

(Continued)

*Primary Examiner* — Jung-Mu Chuang
(74) *Attorney, Agent, or Firm* — Perkins Coie LLP

(57) ABSTRACT

Techniques are disclosed for a web or mobile interface enabling users and collaborators to simultaneously comment, edit, or edit content in real time or near real time managed by a cloud-based collaboration platform. In one embodiment, the data to be accessed concurrently is presented or depicted at the multiple physical devices to the collaborators for viewing and accessing the data in real time or near real time. Each of the collaborators is able to view, re-edit, or re-modify in a concurrent fashion, at the collaborator's physical device, edits or modifications made to the data in real time or near real time as a result of any of the other collaborators accessing the data at their respective physical devices. In some instances, additional collaborators are specifiable for the data created for concurrent real time access in addition to those originally associated with the folder.

9 Claims, 16 Drawing Sheets

(56) References Cited

U.S. PATENT DOCUMENTS

| | | | |
|---|---|---|---|
| 5,787,175 A | 7/1998 | Carter | |
| 5,799,320 A | 8/1998 | Klug | |
| 5,848,415 A | 12/1998 | Guck | |
| 5,864,870 A | 1/1999 | Guck | |
| 5,893,126 A * | 4/1999 | Drews | G06F 3/0481 715/203 |
| 5,999,908 A | 12/1999 | Abelow | |
| 6,016,467 A | 1/2000 | Newsted et al. | |
| 6,034,621 A | 3/2000 | Kaufman | |
| 6,055,543 A | 4/2000 | Christensen et al. | |
| 6,073,161 A | 6/2000 | DeBoskey et al. | |
| 6,097,390 A * | 8/2000 | Marks | G06F 3/04812 715/772 |
| 6,098,078 A | 8/2000 | Gehani et al. | |
| 6,233,600 B1 | 5/2001 | Salas et al. | |
| 6,260,040 B1 | 7/2001 | Kauffman et al. | |
| 6,289,345 B1 | 9/2001 | Yasue | |
| 6,292,803 B1 | 9/2001 | Richardson et al. | |
| 6,336,124 B1 | 1/2002 | Alam et al. | |
| 6,342,906 B1 * | 1/2002 | Kumar | G06F 3/1454 709/201 |
| 6,345,386 B1 | 2/2002 | Delo et al. | |
| 6,370,543 B2 | 4/2002 | Hoffert et al. | |
| 6,374,260 B1 | 4/2002 | Hoffert et al. | |
| 6,385,606 B2 | 5/2002 | Inohara et al. | |
| 6,396,593 B1 | 5/2002 | Laverty et al. | |
| 6,515,681 B1 | 2/2003 | Knight | |
| 6,539,381 B1 | 3/2003 | Prasad et al. | |
| 6,584,466 B1 | 6/2003 | Serbinis et al. | |
| 6,636,872 B1 | 10/2003 | Heath et al. | |
| 6,654,737 B1 | 11/2003 | Nunez | |
| 6,662,186 B1 | 12/2003 | Esquibel et al. | |
| 6,687,878 B1 | 2/2004 | Eintracht et al. | |
| 6,714,968 B1 | 3/2004 | Prust | |
| 6,735,623 B1 | 5/2004 | Prust | |
| 6,742,181 B1 | 5/2004 | Koike et al. | |
| 6,760,721 B1 | 7/2004 | Chasen et al. | |
| 6,789,109 B2 * | 9/2004 | Samra | G06F 17/241 709/220 |
| 6,859,909 B1 * | 2/2005 | Lerner | G06F 3/04883 345/440 |
| 6,947,162 B2 | 9/2005 | Rosenberg et al. | |
| 6,952,724 B2 | 10/2005 | Prust | |
| 6,996,768 B1 | 2/2006 | Elo et al. | |
| 7,010,752 B2 | 3/2006 | Ly | |
| 7,020,697 B1 | 3/2006 | Goodman et al. | |
| 7,039,806 B1 | 5/2006 | Friedman et al. | |
| 7,069,393 B2 | 6/2006 | Miyata et al. | |
| 7,107,549 B2 * | 9/2006 | Deaton | G06F 3/04815 707/E17.111 |
| 7,133,834 B1 | 11/2006 | Abelow | |
| 7,149,787 B1 | 12/2006 | Mutalik et al. | |
| 7,152,182 B2 | 12/2006 | Ji et al. | |
| 7,155,435 B1 * | 12/2006 | Day | G06Q 10/00 705/1.1 |
| 7,155,483 B1 | 12/2006 | Friend et al. | |
| 7,165,107 B2 | 1/2007 | Pouyoul et al. | |
| 7,213,206 B2 | 5/2007 | Fogg | |
| 7,222,078 B2 | 5/2007 | Abelow | |
| 7,243,299 B1 * | 7/2007 | Rubin | G06F 3/0483 707/E17.116 |
| 7,246,118 B2 * | 7/2007 | Chastain | G06F 17/241 |
| 7,275,244 B1 | 9/2007 | Charles Bell et al. | |
| 7,296,025 B2 | 11/2007 | Kung et al. | |
| 7,305,436 B2 * | 12/2007 | Willis | G06F 17/30702 707/999.007 |
| 7,346,778 B1 | 3/2008 | Guiter et al. | |
| 7,353,252 B1 * | 4/2008 | Yang | G06Q 10/10 709/204 |
| 7,370,269 B1 | 5/2008 | Prabhu et al. | |
| 7,401,117 B2 | 7/2008 | Dan et al. | |
| 7,437,421 B2 * | 10/2008 | Bhogal | G06F 17/24 705/35 |
| 7,467,415 B2 * | 12/2008 | Carter | G06F 21/6209 705/51 |
| 7,496,830 B2 * | 2/2009 | Rubin | G06F 3/0483 715/205 |
| 7,496,841 B2 * | 2/2009 | Hadfield | G06Q 10/10 707/999.007 |
| 7,543,000 B2 | 6/2009 | Castro et al. | |
| 7,581,221 B2 | 8/2009 | Lai et al. | |
| 7,620,565 B2 | 11/2009 | Abelow | |
| 7,627,831 B2 * | 12/2009 | Chiu | G06F 17/30058 715/767 |
| 7,647,559 B2 | 1/2010 | Yozell-Epstein et al. | |
| 7,650,367 B2 | 1/2010 | Arruza | |
| 7,661,088 B2 | 2/2010 | Burke | |
| 7,665,093 B2 | 2/2010 | Maybee et al. | |
| 7,676,542 B2 | 3/2010 | Moser et al. | |
| 7,698,363 B2 | 4/2010 | Dan et al. | |
| 7,734,600 B1 | 6/2010 | Wise et al. | |
| 7,756,843 B1 | 7/2010 | Palmer | |
| 7,774,412 B1 | 8/2010 | Schnepel | |
| 7,814,426 B2 | 10/2010 | Huesken et al. | |
| 7,886,287 B1 | 2/2011 | Davda | |
| 7,890,964 B2 | 2/2011 | Vogler-Ivashchanka et al. | |
| 7,930,418 B2 * | 4/2011 | Samra | G06F 17/241 709/231 |
| 7,937,663 B2 | 5/2011 | Parker et al. | |
| 7,958,453 B1 | 6/2011 | Taing | |
| 7,962,853 B2 * | 6/2011 | Bedi | G06F 17/248 709/206 |
| 7,979,296 B2 | 7/2011 | Kruse et al. | |
| 7,996,374 B1 | 8/2011 | Jones et al. | |
| 8,024,661 B2 | 9/2011 | Bibliowicz et al. | |
| 8,027,976 B1 | 9/2011 | Ding et al. | |
| RE42,904 E | 11/2011 | Stephens, Jr. | |
| 8,065,739 B1 | 11/2011 | Bruening et al. | |
| 8,090,361 B2 | 1/2012 | Hagan | |
| 8,108,779 B1 | 1/2012 | Rein et al. | |
| 8,117,261 B2 | 2/2012 | Briere et al. | |
| 8,140,513 B2 | 3/2012 | Ghods et al. | |
| 8,151,183 B2 | 4/2012 | Chen et al. | |
| 8,185,830 B2 | 5/2012 | Saha et al. | |
| 8,214,747 B1 | 7/2012 | Yankovich et al. | |
| 8,230,348 B2 | 7/2012 | Peters et al. | |
| 8,347,276 B2 | 1/2013 | Schadow | |
| 8,358,701 B2 | 1/2013 | Chou et al. | |
| 8,374,944 B2 * | 2/2013 | Robb | G06F 9/54 705/35 |
| 8,429,540 B1 | 4/2013 | Yankovich et al. | |
| 8,464,161 B2 * | 6/2013 | Giles | G06F 21/604 345/419 |
| 8,527,549 B2 | 9/2013 | Cidon | |
| 8,549,066 B1 | 10/2013 | Donahue et al. | |
| 8,549,511 B2 | 10/2013 | Seki et al. | |
| 8,607,306 B1 | 12/2013 | Bridge et al. | |
| 8,682,973 B2 * | 3/2014 | Kikin-Gil | H04L 65/4015 709/204 |
| 8,706,810 B2 * | 4/2014 | Vishnubhatla | H04L 67/06 709/204 |
| 8,756,513 B1 * | 6/2014 | Schmieder | G06F 3/0482 715/753 |
| 8,849,955 B2 | 9/2014 | Prahlad et al. | |
| 8,892,679 B1 | 11/2014 | Destagnol et al. | |
| 8,943,197 B1 | 1/2015 | Taylor et al. | |
| 9,053,079 B2 * | 6/2015 | Bailor | G06F 17/24 |
| 9,063,912 B2 * | 6/2015 | Seibert, Jr. | G06F 17/212 |
| 9,069,743 B2 * | 6/2015 | Kotler | G06F 17/241 |
| 9,197,718 B2 * | 11/2015 | Kiang | H04L 67/327 |
| 9,223,635 B2 | 12/2015 | Huang et al. | |
| 9,224,073 B2 * | 12/2015 | Okajima | G06F 3/1207 |
| 9,224,129 B2 | 12/2015 | Sitrick et al. | |
| 9,235,268 B2 * | 1/2016 | Arrasvuori | G06F 3/017 |
| 9,252,962 B1 * | 2/2016 | Valeti | H04L 12/1827 |
| 9,256,341 B2 | 2/2016 | Megiddo et al. | |
| 9,357,076 B2 | 5/2016 | Rosenberg | |
| 9,483,473 B2 | 11/2016 | Ansel et al. | |
| 2001/0027492 A1 | 10/2001 | Gupta | |
| 2002/0049786 A1 | 4/2002 | Bibliowicz et al. | |
| 2002/0091738 A1 | 7/2002 | Rohrabaugh et al. | |

(56) References Cited

U.S. PATENT DOCUMENTS

| | | | |
|---|---|---|---|
| 2002/0099552 A1* | 7/2002 | Rubin | G09F 27/00 704/270 |
| 2002/0099772 A1 | 7/2002 | Deshpande et al. | |
| 2002/0133509 A1 | 9/2002 | Johnston et al. | |
| 2002/0147770 A1 | 10/2002 | Tang | |
| 2002/0194177 A1 | 12/2002 | Sherman et al. | |
| 2003/0009459 A1* | 1/2003 | Chastain | G06F 17/241 |
| 2003/0041095 A1 | 2/2003 | Konda et al. | |
| 2003/0084306 A1 | 5/2003 | Abburi et al. | |
| 2003/0093404 A1 | 5/2003 | Bader et al. | |
| 2003/0108052 A1 | 6/2003 | Inoue et al. | |
| 2003/0110264 A1 | 6/2003 | Whidby et al. | |
| 2003/0115326 A1 | 6/2003 | Verma et al. | |
| 2003/0135536 A1 | 7/2003 | Lyons | |
| 2003/0135565 A1 | 7/2003 | Estrada | |
| 2003/0154306 A1 | 8/2003 | Perry | |
| 2003/0204490 A1 | 10/2003 | Kasriel | |
| 2003/0217171 A1 | 11/2003 | Von Stuermer et al. | |
| 2004/0021686 A1 | 2/2004 | Barberis | |
| 2004/0088647 A1 | 5/2004 | Miller et al. | |
| 2004/0103147 A1 | 5/2004 | Flesher et al. | |
| 2004/0111415 A1 | 6/2004 | Scardino et al. | |
| 2004/0117438 A1 | 6/2004 | Considine et al. | |
| 2004/0122949 A1 | 6/2004 | Zmudzinski et al. | |
| 2004/0128359 A1 | 7/2004 | Horvitz et al. | |
| 2004/0172588 A1* | 9/2004 | Mattaway | H04L 12/1822 715/201 |
| 2004/0177138 A1 | 9/2004 | Salle et al. | |
| 2004/0181579 A1 | 9/2004 | Huck et al. | |
| 2004/0205653 A1* | 10/2004 | Hadfield | G06Q 10/10 715/255 |
| 2004/0221239 A1* | 11/2004 | Hachigian | G09B 7/02 715/762 |
| 2004/0230624 A1 | 11/2004 | Frolund et al. | |
| 2004/0246532 A1 | 12/2004 | Inada | |
| 2004/0250201 A1 | 12/2004 | Caspi | |
| 2004/0267836 A1 | 12/2004 | Armangau et al. | |
| 2005/0005276 A1 | 1/2005 | Morgan | |
| 2005/0010860 A1 | 1/2005 | Weiss et al. | |
| 2005/0018828 A1 | 1/2005 | Nierhaus et al. | |
| 2005/0022229 A1 | 1/2005 | Gabriel et al. | |
| 2005/0033813 A1* | 2/2005 | Bhogal | G06F 17/24 709/206 |
| 2005/0050228 A1 | 3/2005 | Perham et al. | |
| 2005/0063083 A1 | 3/2005 | Dart et al. | |
| 2005/0097225 A1 | 5/2005 | Glatt et al. | |
| 2005/0102328 A1 | 5/2005 | Ring et al. | |
| 2005/0108406 A1 | 5/2005 | Lee et al. | |
| 2005/0114305 A1 | 5/2005 | Haynes et al. | |
| 2005/0114378 A1 | 5/2005 | Elien et al. | |
| 2005/0182966 A1 | 8/2005 | Pham et al. | |
| 2005/0198299 A1 | 9/2005 | Beck et al. | |
| 2005/0198452 A1 | 9/2005 | Watanabe | |
| 2005/0209808 A1* | 9/2005 | Kelbon | G01R 1/025 702/117 |
| 2005/0234864 A1 | 10/2005 | Shapiro | |
| 2005/0234943 A1 | 10/2005 | Clarke | |
| 2005/0261933 A1 | 11/2005 | Magnuson | |
| 2006/0026502 A1 | 2/2006 | Dutta | |
| 2006/0026535 A1 | 2/2006 | Hotelling et al. | |
| 2006/0036568 A1 | 2/2006 | Moore et al. | |
| 2006/0041603 A1 | 2/2006 | Paterson et al. | |
| 2006/0047804 A1 | 3/2006 | Fredricksen et al. | |
| 2006/0053088 A1 | 3/2006 | Ali et al. | |
| 2006/0053380 A1 | 3/2006 | Spataro et al. | |
| 2006/0070083 A1 | 3/2006 | Brunswig et al. | |
| 2006/0075071 A1 | 4/2006 | Gillette | |
| 2006/0080432 A1 | 4/2006 | Spataro et al. | |
| 2006/0123062 A1 | 6/2006 | Bobbitt et al. | |
| 2006/0133340 A1 | 6/2006 | Rybak et al. | |
| 2006/0168550 A1 | 7/2006 | Muller et al. | |
| 2006/0174051 A1 | 8/2006 | Lordi et al. | |
| 2006/0174054 A1 | 8/2006 | Matsuki | |
| 2006/0179070 A1 | 8/2006 | George et al. | |
| 2006/0259524 A1 | 11/2006 | Horton | |
| 2006/0265719 A1 | 11/2006 | Astl et al. | |
| 2006/0271510 A1 | 11/2006 | Harward et al. | |
| 2007/0016680 A1 | 1/2007 | Burd et al. | |
| 2007/0038934 A1 | 2/2007 | Fellman | |
| 2007/0079242 A1 | 4/2007 | Jolley et al. | |
| 2007/0100830 A1 | 5/2007 | Beedubail et al. | |
| 2007/0115845 A1 | 5/2007 | Hochwarth et al. | |
| 2007/0118598 A1 | 5/2007 | Bedi et al. | |
| 2007/0124460 A1 | 5/2007 | McMullen et al. | |
| 2007/0124737 A1 | 5/2007 | Wensley et al. | |
| 2007/0124781 A1 | 5/2007 | Casey et al. | |
| 2007/0126635 A1 | 6/2007 | Houri | |
| 2007/0130143 A1 | 6/2007 | Zhang et al. | |
| 2007/0130163 A1 | 6/2007 | Perez et al. | |
| 2007/0198609 A1 | 8/2007 | Black et al. | |
| 2007/0208878 A1 | 9/2007 | Barnes-Leon et al. | |
| 2007/0214180 A1 | 9/2007 | Crawford | |
| 2007/0220016 A1 | 9/2007 | Estrada et al. | |
| 2007/0220590 A1 | 9/2007 | Rasmussen et al. | |
| 2007/0240057 A1 | 10/2007 | Satterfield et al. | |
| 2007/0250762 A1 | 10/2007 | Mansfield | |
| 2007/0256065 A1 | 11/2007 | Heishi et al. | |
| 2007/0266304 A1 | 11/2007 | Fletcher et al. | |
| 2007/0282848 A1 | 12/2007 | Kiilerich et al. | |
| 2007/0283443 A1 | 12/2007 | McPherson et al. | |
| 2007/0288290 A1 | 12/2007 | Motoyama et al. | |
| 2008/0005135 A1 | 1/2008 | Muthukrishnan et al. | |
| 2008/0005195 A1 | 1/2008 | Li | |
| 2008/0016146 A1 | 1/2008 | Gan et al. | |
| 2008/0021959 A1 | 1/2008 | Naghi et al. | |
| 2008/0028323 A1 | 1/2008 | Rosen et al. | |
| 2008/0040173 A1 | 2/2008 | Aleong et al. | |
| 2008/0040503 A1 | 2/2008 | Kleks et al. | |
| 2008/0046828 A1 | 2/2008 | Bibliowicz et al. | |
| 2008/0059656 A1 | 3/2008 | Saliba et al. | |
| 2008/0077631 A1 | 3/2008 | Petri | |
| 2008/0084984 A1 | 4/2008 | Levy et al. | |
| 2008/0091763 A1 | 4/2008 | Devonshire et al. | |
| 2008/0091790 A1 | 4/2008 | Beck | |
| 2008/0104277 A1 | 5/2008 | Tian | |
| 2008/0114720 A1 | 5/2008 | Smith et al. | |
| 2008/0133674 A1 | 6/2008 | Knauerhase et al. | |
| 2008/0140732 A1 | 6/2008 | Wilson et al. | |
| 2008/0147790 A1 | 6/2008 | Malaney et al. | |
| 2008/0147810 A1* | 6/2008 | Kumar | H04L 67/38 709/206 |
| 2008/0151817 A1 | 6/2008 | Fitchett et al. | |
| 2008/0154873 A1 | 6/2008 | Redlich et al. | |
| 2008/0182628 A1 | 7/2008 | Lee et al. | |
| 2008/0183467 A1 | 7/2008 | Yuan et al. | |
| 2008/0184130 A1 | 7/2008 | Tien et al. | |
| 2008/0194239 A1 | 8/2008 | Hagan | |
| 2008/0215883 A1 | 9/2008 | Fok et al. | |
| 2008/0222654 A1 | 9/2008 | Xu et al. | |
| 2008/0243855 A1 | 10/2008 | Prahlad et al. | |
| 2008/0250333 A1 | 10/2008 | Reeves et al. | |
| 2008/0250348 A1 | 10/2008 | Alimpich et al. | |
| 2008/0263099 A1 | 10/2008 | Brady-Kalnay et al. | |
| 2008/0271095 A1 | 10/2008 | Shafton | |
| 2008/0276158 A1 | 11/2008 | Lim et al. | |
| 2009/0015864 A1 | 1/2009 | Hasegawa | |
| 2009/0019093 A1 | 1/2009 | Brodersen et al. | |
| 2009/0019426 A1 | 1/2009 | Baeumer et al. | |
| 2009/0030710 A1 | 1/2009 | Levine | |
| 2009/0049131 A1 | 2/2009 | Lyle et al. | |
| 2009/0094546 A1* | 4/2009 | Anzelde | G06F 9/4443 715/772 |
| 2009/0106642 A1* | 4/2009 | Albornoz | G06Q 10/10 715/230 |
| 2009/0111509 A1 | 4/2009 | Mednieks et al. | |
| 2009/0119322 A1 | 5/2009 | Mills et al. | |
| 2009/0125469 A1 | 5/2009 | McDonald et al. | |
| 2009/0132651 A1 | 5/2009 | Roger et al. | |
| 2009/0138808 A1 | 5/2009 | Moromisato et al. | |
| 2009/0150417 A1 | 6/2009 | Ghods et al. | |
| 2009/0150627 A1 | 6/2009 | Benhase et al. | |
| 2009/0158142 A1 | 6/2009 | Arthursson et al. | |
| 2009/0164438 A1 | 6/2009 | Delacruz | |

(56) References Cited

U.S. PATENT DOCUMENTS

| | | |
|---|---|---|
| 2009/0171983 A1 | 7/2009 | Samji et al. |
| 2009/0193107 A1 | 7/2009 | Srinivasan et al. |
| 2009/0193345 A1* | 7/2009 | Wensley ............ H04L 65/4015 715/756 |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300527 A1 | 12/2009 | Malcolm et al. |
| 2009/0307604 A1* | 12/2009 | Giles .................... G06F 21/604 715/751 |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0040217 A1 | 2/2010 | Aberg et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0113320 A1 | 5/2011 | Neff et al. |
| 2011/0119313 A1 | 5/2011 | Sung et al. |
| 2011/0134204 A1 | 6/2011 | Rodriguez et al. |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209052 A1* | 8/2011 | Parker .................... G06F 3/0483 715/255 |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0249024 A1* | 10/2011 | Arrasvuori ............. G06F 3/017 345/629 |
| 2011/0252071 A1 | 10/2011 | Cidon |
| 2011/0252339 A1* | 10/2011 | Lemonik ............ G06F 17/2288 715/753 |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0036423 A1* | 2/2012 | Haynes, II ............ G06F 17/241 715/230 |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0185913 A1 | 7/2012 | Martinez et al. |
| 2012/0192055 A1 | 7/2012 | Antebi et al. |
| 2012/0192086 A1 | 7/2012 | Ghods et al. |

(56) References Cited

U.S. PATENT DOCUMENTS

| | | | |
|---|---|---|---|
| 2012/0192099 A1* | 7/2012 | Carbonera | G06Q 10/1093 715/781 |
| 2012/0203908 A1 | 8/2012 | Beaty et al. | |
| 2012/0204032 A1 | 8/2012 | Wilkins et al. | |
| 2012/0214444 A1 | 8/2012 | McBride et al. | |
| 2012/0218885 A1 | 8/2012 | Abel et al. | |
| 2012/0221789 A1 | 8/2012 | Felter | |
| 2012/0221937 A1* | 8/2012 | Patterson | G06F 17/2235 715/230 |
| 2012/0226767 A1 | 9/2012 | Luna et al. | |
| 2012/0233155 A1 | 9/2012 | Gallmeier et al. | |
| 2012/0233205 A1 | 9/2012 | McDermott | |
| 2012/0233543 A1 | 9/2012 | Vagell et al. | |
| 2012/0240061 A1 | 9/2012 | Hillenius et al. | |
| 2012/0257249 A1 | 10/2012 | Natarajan | |
| 2012/0263166 A1 | 10/2012 | Cho et al. | |
| 2012/0266203 A1 | 10/2012 | Elhadad et al. | |
| 2012/0284638 A1 | 11/2012 | Cutler et al. | |
| 2012/0284664 A1 | 11/2012 | Zhao | |
| 2012/0291011 A1 | 11/2012 | Quine | |
| 2012/0296790 A1* | 11/2012 | Robb | G06F 9/54 705/35 |
| 2012/0309540 A1 | 12/2012 | Holme et al. | |
| 2012/0311157 A1 | 12/2012 | Erickson et al. | |
| 2012/0317239 A1 | 12/2012 | Mulder et al. | |
| 2012/0317487 A1 | 12/2012 | Lieb et al. | |
| 2012/0328259 A1 | 12/2012 | Seibert, Jr. et al. | |
| 2012/0331177 A1 | 12/2012 | Jensen | |
| 2012/0331441 A1 | 12/2012 | Adamson | |
| 2013/0007245 A1 | 1/2013 | Malik et al. | |
| 2013/0007471 A1 | 1/2013 | Grab et al. | |
| 2013/0007894 A1 | 1/2013 | Dang et al. | |
| 2013/0013560 A1 | 1/2013 | Goldberg et al. | |
| 2013/0014023 A1 | 1/2013 | Lee et al. | |
| 2013/0024418 A1* | 1/2013 | Sitrick | G06F 17/241 707/608 |
| 2013/0031208 A1 | 1/2013 | Linton et al. | |
| 2013/0042106 A1 | 2/2013 | Persaud et al. | |
| 2013/0047093 A1 | 2/2013 | Reuschel et al. | |
| 2013/0055127 A1 | 2/2013 | Saito et al. | |
| 2013/0067232 A1 | 3/2013 | Cheung et al. | |
| 2013/0067594 A1 | 3/2013 | Kantor et al. | |
| 2013/0073403 A1 | 3/2013 | Tuchman et al. | |
| 2013/0080913 A1* | 3/2013 | Rodrig | G06F 3/0483 715/751 |
| 2013/0080919 A1 | 3/2013 | Kiang et al. | |
| 2013/0080966 A1* | 3/2013 | Kikin-Gil | G06F 3/0483 715/776 |
| 2013/0091440 A1* | 4/2013 | Kotler | G06Q 10/10 715/753 |
| 2013/0097481 A1* | 4/2013 | Kotler | G06F 17/241 715/230 |
| 2013/0117240 A1 | 5/2013 | Taylor et al. | |
| 2013/0117337 A1 | 5/2013 | Dunham | |
| 2013/0117376 A1 | 5/2013 | Filman et al. | |
| 2013/0124638 A1 | 5/2013 | Barreto et al. | |
| 2013/0138608 A1 | 5/2013 | Smith | |
| 2013/0138615 A1 | 5/2013 | Gupta et al. | |
| 2013/0151940 A1* | 6/2013 | Bailor | G06F 17/24 715/229 |
| 2013/0155071 A1 | 6/2013 | Chan et al. | |
| 2013/0159411 A1 | 6/2013 | Bowen | |
| 2013/0163289 A1 | 6/2013 | Kim et al. | |
| 2013/0167253 A1 | 6/2013 | Seleznev et al. | |
| 2013/0169742 A1 | 7/2013 | Wu et al. | |
| 2013/0185347 A1 | 7/2013 | Romano | |
| 2013/0185558 A1 | 7/2013 | Seibert et al. | |
| 2013/0191339 A1 | 7/2013 | Haden et al. | |
| 2013/0198600 A1 | 8/2013 | Lockhart et al. | |
| 2013/0212486 A1 | 8/2013 | Joshi et al. | |
| 2013/0218978 A1 | 8/2013 | Weinstein et al. | |
| 2013/0239049 A1 | 9/2013 | Perrodin et al. | |
| 2013/0246932 A1 | 9/2013 | Zaveri et al. | |
| 2013/0262210 A1 | 10/2013 | Savage et al. | |
| 2013/0262862 A1 | 10/2013 | Hartley | |
| 2013/0268480 A1 | 10/2013 | Dorman | |
| 2013/0268491 A1 | 10/2013 | Chung et al. | |
| 2013/0275398 A1 | 10/2013 | Dorman et al. | |
| 2013/0275429 A1 | 10/2013 | York et al. | |
| 2013/0275509 A1 | 10/2013 | Micucci et al. | |
| 2013/0305039 A1 | 11/2013 | Gauda | |
| 2013/0311551 A1 | 11/2013 | Thibeault | |
| 2013/0326344 A1 | 12/2013 | Masselle et al. | |
| 2014/0013112 A1 | 1/2014 | Cidon et al. | |
| 2014/0019497 A1 | 1/2014 | Cidon et al. | |
| 2014/0019498 A1 | 1/2014 | Cidon et al. | |
| 2014/0019882 A1 | 1/2014 | Chew et al. | |
| 2014/0026025 A1* | 1/2014 | Smith | G06Q 10/101 715/230 |
| 2014/0032489 A1 | 1/2014 | Hebbar et al. | |
| 2014/0032616 A1 | 1/2014 | Nack | |
| 2014/0033277 A1 | 1/2014 | Xiao et al. | |
| 2014/0033291 A1 | 1/2014 | Liu | |
| 2014/0052939 A1 | 2/2014 | Tseng et al. | |
| 2014/0068589 A1 | 3/2014 | Barak | |
| 2014/0150023 A1 | 5/2014 | Gudorf et al. | |
| 2014/0156373 A1 | 6/2014 | Roberts et al. | |
| 2014/0172595 A1 | 6/2014 | Beddow et al. | |
| 2014/0280961 A1 | 9/2014 | Martinez et al. | |
| 2014/0310345 A1 | 10/2014 | Megiddo et al. | |
| 2014/0351346 A1 | 11/2014 | Barton | |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

"How-to Geek, How to Sync Specific Folders With Dropbox," downloaded from the internet http://www.howtogeek.com, Apr. 23, 2013, 5 pages.

"Microsoft Office SharePoint 2007 User Guide," Feb. 16, 2010, pp. 1-48.

(56) References Cited

OTHER PUBLICATIONS

"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
Exam Report for EP13158415.3, Applicant: Box, Inc. Mailed Jun. 4, 2013, 8 pages.
Exam Report for GB1300188.8, Applicant: Box, Inc. Mailed May 31, 2013, 8 pages.
Exam Report for GB1306011.6, Applicant: Box, Inc. Mailed Apr. 18, 2013, 8 pages.
Exam Report for GB1310666.1, Applicant: Box, Inc. Mailed Aug. 30, 2013, 10 pages.
Exam Report for GB1313559.5, Applicant: Box, Inc., Mailed Aug. 22, 2013, 19 pages.
Google Docs, http://web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/047530, Applicant: Box, Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2011/057938, Applicant: Box, Inc., Mailed Mar. 29, 2013, 10 pages.
International Search Report and Written Opinion for PCT/US2011/060875 Mailed Oct. 30, 2012, pp. 1-10.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/070366, Applicant: Box, Inc., Mailed Apr. 24, 2013, 10 pages.
International Search Report and Written Opinion for PCT/US2013/020267, Applicant: Box, Inc., Mailed May 7, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/029520, Applicant: Box, Inc., Mailed Jun. 26, 2013, 10 pages.
International Search Report and Written Opinion for PCT/US2013/034662, Applicant: Box, Inc., Mailed May 31, 2013, 10 pages.
International Search Report and Written Opinion for PCT/US2013/035404, Applicant: Box, Inc., Mailed Jun. 26, 2013, 13 pages.
International Search Report and Written Opinion for PCT/US2013/039782, Applicant: Box, Inc., Mailed Aug. 28, 2013, 15 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. Mailed Nov. 21, 2013, 7 pages.
Exam Report for EP13185269.1, Applicant: Box, Inc. Mailed Jan. 28, 7 pages.
Exam Report for GB1309209.3, Applicant: Box, Inc. Mailed Oct. 30, 2013, 11 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
Gedymin, "Cloud computing with an emphasis on Google App Engine," Master Final Project, Sep. 2011, 146 pages.
International Search Report and Written Opinion for PCT/US2013/034765, Applicant: Box, Inc., Mailed Jan. 20, 2014, 15 pages.
Patent Court Document of Approved Judgment for GB0602349.3 and GB0623571.7; Mar. 3, 2009, 17 pages.
Exam Report for GB1314771.5, Applicant: Box, Inc. Mailed Feb. 17, 2014, 7 pages.
Exam Report for GB1308842.2, Applicant: Box, Inc. Mailed Mar. 10, 2014, 4 pages.
Burns, "Developing Secure Mobile Applications for Android," Oct. 2008, Version 1.0, 1-28 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.

(56) References Cited

OTHER PUBLICATIONS

Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the Internet, http://web. Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for GB1312264.3, Applicant: Box, Inc. Mailed Mar. 24, 2014, 7 pages.
John et al., "Always Sync Support Forums—View topic—Allway sync funny behavior," Allway Sync Support Forum at http://syncenter.com, Mar. 28, 2011, XP055109680, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Search Report for EP14151588.2, Applicant: Box, Inc. Mailed Apr. 15, 2014, 12 pages.
Search Report for EP14153783.7, Applicant: Box, Inc. Mailed Apr. 3, 2014, 6 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Exam Report for GB1318792.7, Applicant: Box, Inc. Mailed May 22, 2014, 2 pages.
Exam Report for EP13177108.1, Applicant: Box, Inc. Mailed May 26, 2014, 6 pages.
Matt V., "Comparison of Lightbox-type Modules," (http://web.archive.org/web/20130510120527/http://drupal.org/node/266126; dated May 10, 2013; last accessed Jun. 23, 2015, 15 pages.
Exam Report for GB1415314.2; Applicant: Box, Inc. Mailed Aug. 14, 2015, 2 pages.
Exam Report for GB1410569.6 Applicant: Box, Inc. Mailed Jul. 11, 2014, 9 pages.
Sommerer, "Presentable Document Format: Improved On-demand PDF to HTML Conversion," retrieved from the internet, http://research.microsoft.com, Nov. 2004, 8 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Search Report for EP 13189144.2 Applicant: Box, Inc. Mailed Sep. 1, 2014, 9 pages.
U.S. Appl. No. 14/042,473, filed Sep. 30, 2013 Simultaneous Editing/Accessing of Content by a Collaborator Invitation Through a Web-Based or Mobile Application to a Cloud-Based Collaboration Platform.
U.S. Appl. No. 14/026,837, filed Sep. 13, 2013 Mobile Device, Methods and User Interfaces Thereof in a Mobile Device Platform Featuring Multifunctional Access and Engagement in a Collaborative Environment Provided by a Cloud-Based Platform.
U.S. Appl. No. 14/166,414, filed Jan. 28, 2014 System and Method of a Multi-Functional Managing User Interface for Accessing a Cloud-Based Platform via Mobile Devices.
U.S. Appl. No. 61/877,938, filed Sep. 13, 2013 High Availability Architecture for a Cloud-Based Concurrent-Access Collaboration Platform.
U.S. Appl. No. 14/474,507, filed Sep. 2, 2014 High Availability Architecture for a Cloud-Based Concurrent-Access Collaboration Platform.
U.S. Appl. No. 61/894,340, filed Oct. 22, 2013 Desktop Application for Accessing a Cloud Collaboration Platform.
U.S. Appl. No. 14/521,134, filed Oct. 22, 2014 Desktop Application for Accessing a Cloud Collaboration Platform.

\* cited by examiner

SIMULTANEOUS EDITING/ACCESSING OF CONTENT BY COLLABORATOR INVITATION THROUGH A WEB-BASED OR MOBILE APPLICATION TO A CLOUD-BASED COLLABORATION PLATFORM

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever. The following notice applies to the software and data as described below and in the drawings that form a part of this document: Copyright 2013, Box, Inc., All Rights Reserved.

BACKGROUND

With the advancement in digital and online technologies, people now manage an abundance of information and are in constant communication with others regardless of time and location. Cloud-based collaboration platforms have been developed to support such lifestyles. It can be useful for such platforms to offer features that enable users to create, view, edit, annotate, store, share and otherwise manage information in a user-friendly and efficient manner.

BRIEF DESCRIPTION OF DRAWINGS

The present embodiments are illustrated by way of example and are not intended to be limited by the figures of the accompanying drawings. In the drawings.

The same reference numbers and any acronyms identify elements or acts with the same or similar structure or functionality throughout the drawings and specification for ease of understanding and convenience.

DETAILED DESCRIPTION

Figure 1:
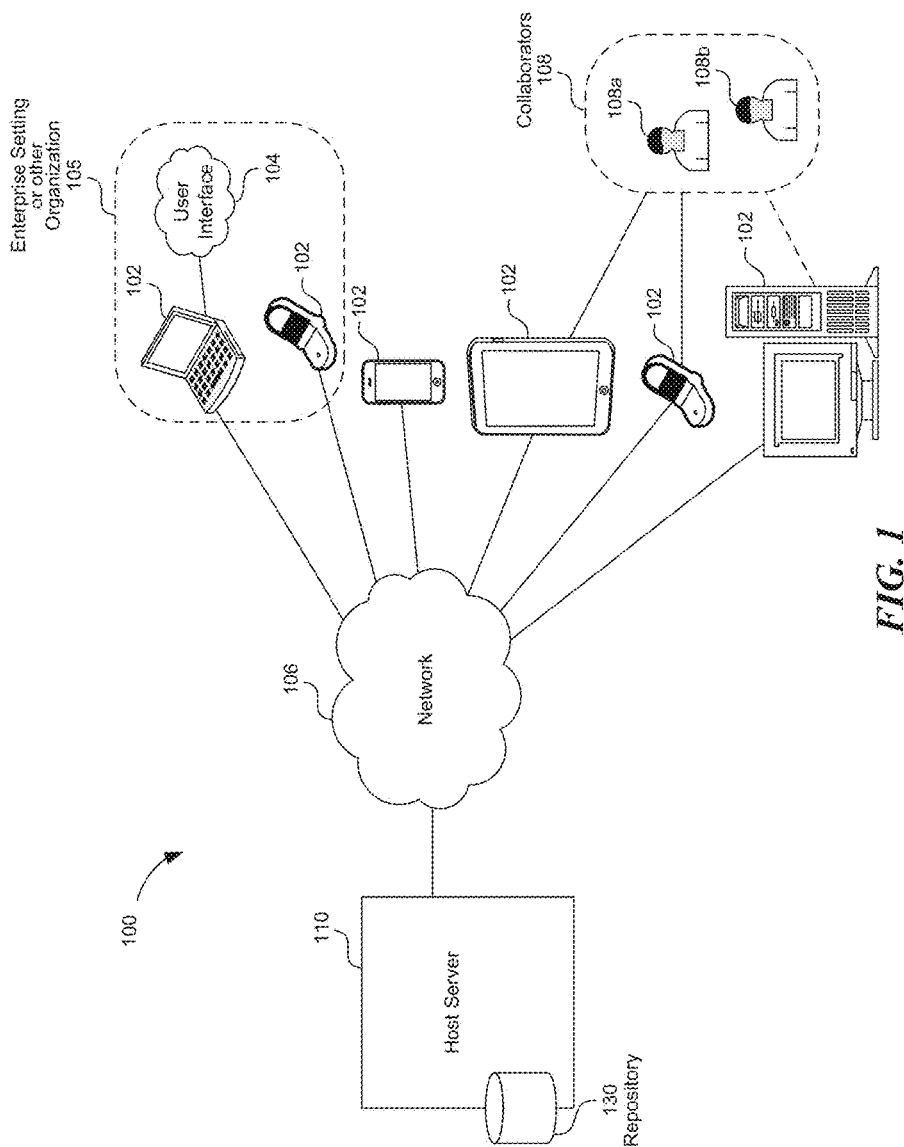
FIG. 1 contains a diagram illustrating an example development and communication environment where users interact with a cloud service, collaboration and/or cloud storage platform.

Techniques are disclosed for a web or mobile interface enabling users and collaborators to simultaneously create, view, edit, annotate, store, share and otherwise manage content in real time or near real time on a cloud-based collaboration platform.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1 illustrates an example system 100 having a host server 110 of a cloud-based service/platform, collaboration workspace and/or cloud storage service with capabilities that enable users and collaborators to simultaneously create, view, edit, annotate, store, share and otherwise manage content in real time or near real time on the cloud-based collaboration platform.

The client devices 102 can be any system and/or device, and/or any combination of devices/systems that is able to establish a communication or a connection, including wired, wireless, cellular connections with another device, a server and/or other systems such as the host server 110. The client devices 102 typically include a display and/or other output functionalities to present information and data exchanged between among the client devices 102 and/or the host server 110.

For example, the client devices 102 can include mobile, handheld or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), mobile-enabled powered watch (e.g., iOS, Android or other platform based), Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102 and host server 110 are coupled via a network 106. In some embodiments and the client devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through the network 106, a web-based collaboration environment or online collaboration platform (e.g., hosted by the host server 110). The collaboration environment or platform can have one or more collective settings 105 for an enterprise or an organization where the users belong, and can provide a user interface 104 for the users to access such platform under the settings 105.

In general, the network 106, over which the client devices 102 and the host server 110 communicate may be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 110 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 2:
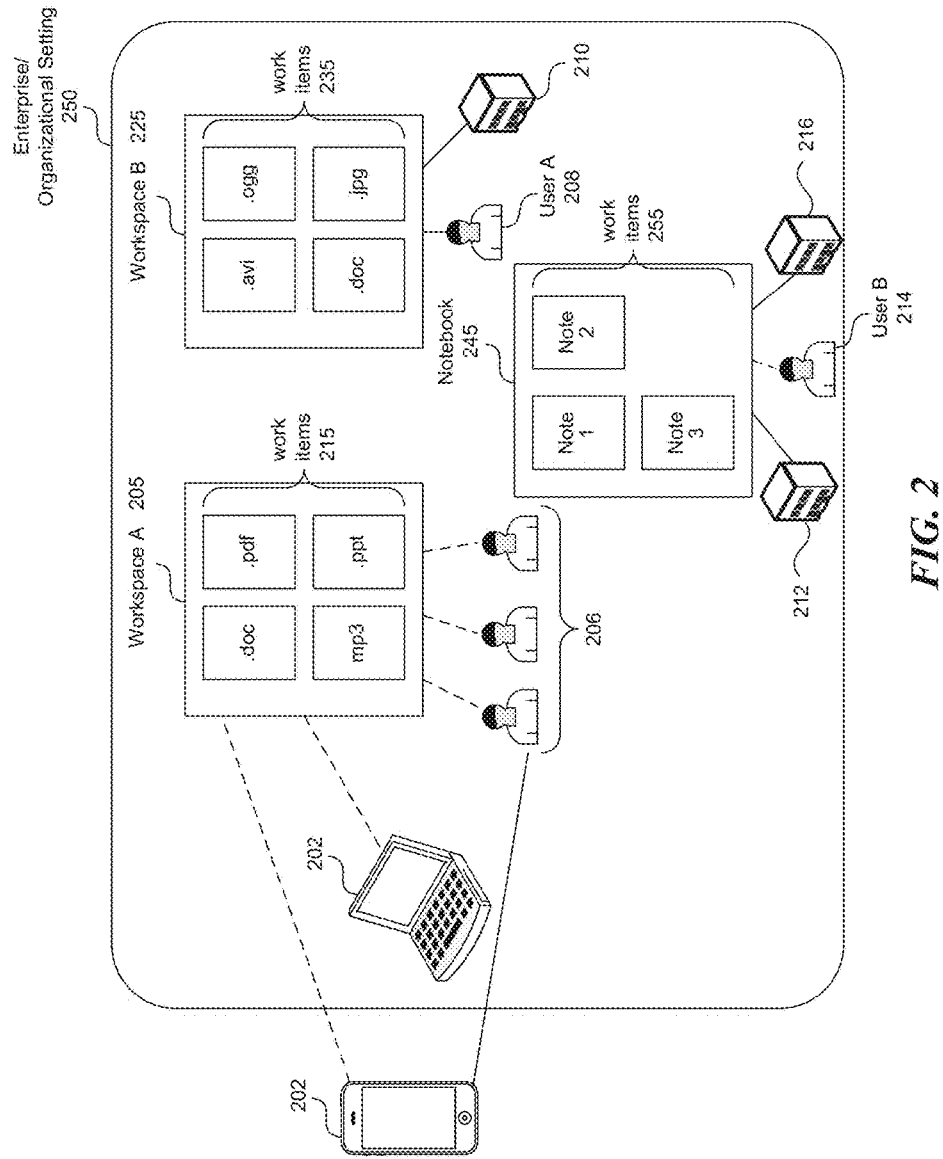
FIG. 2 contains a diagram illustrating an example web-based or online collaboration platform.

FIG. 2 depicts an example web-based or online collaboration platform deployed in an enterprise or other organizational setting 250 for organizing workspaces 205, 225 and 245 and work items 215, 235 and 255.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., client devices 202). For example, the work items 215 and 235 include general dicigital content, such as .pdf files, .doc, slides (e.g., Powerpoint slides), images, audio files, multimedia content, web pages, blogs, etc. On the other hand, the work items 255 comprise "notes" or documents of a proprietary format, which support advanced and unique capabilities of data management and promote collaboration A workspace can generally refer to any grouping of a set of digital content managed by the collaboration platform. For example, the workspaces A 205 and B 225 include general digital content while the workspace 245, referred to as a "notebook", includes notes only. The grouping can be created, identified, or specified by a user or through other means. This user may be a creator user or administrative user, for example.

In general, a workspace can be associated with a set of users or collaborators (e.g., collaborators 108) who have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate on work items such that each user can remotely see edits, revisions, comments, or annotations being made to specific work items through their own user devices. For example, a user can upload a document to a workspace for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators in a workspace.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace 245 can be associated with work items 255. The work items 215, 235, and 255 can be unique to each workspace but need not be. For example, a particular work item or a note can be associated with only one workspace or it can be associated with multiple workspaces.

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208, and workspace N 245 can be associated with departments 212 and 216 and users shown as example user B 214.

In the case of a note in a notebook, collaborators of the notebook can have simultaneous read/write access to the note. Specifically, in a concurrent fashion, each of the collaborators is able to make changes to the note or even edit the changes made by other collaborators. In addition, a list of collaborators can be specified at the note level, so that different notes within the same notebook can be associated with different sets of collaborators.

In each workspace A, B . . . N, when an action is performed on a work item by a given user or any other activity is detected in the workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 can be in the same workspace A 205 and can invite a new collaborator to join the workspace, for example. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Figure 12:
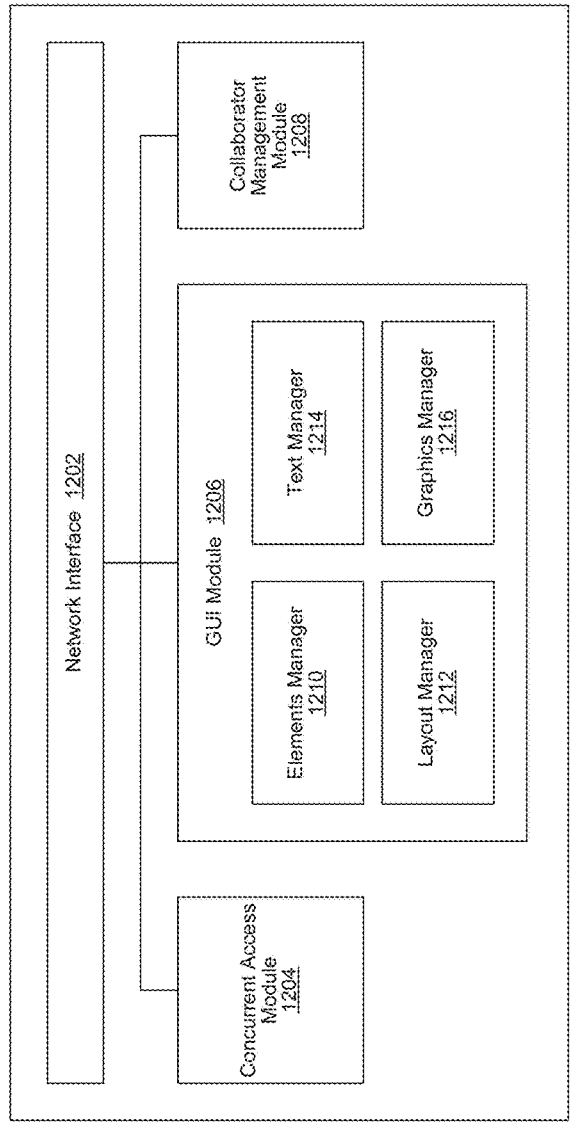
FIG. 12 contains a block diagram illustrating example components in the host server 110 of the web-based collaboration platform.

FIG. 12 contains a block diagram illustrating example components in the web-based collaboration platform hosted by the host server 110. The collaboration platform can include, for example, a network interface 1202, a communication module 1403, a graphical user interface (GUI) module 1206 and a user module 1208. The GUI module 1206 may further include an elements manager 1210, a layout manager 1212, a text manager 1214, and a graphics manager 1216. More or fewer components/modules/engines can be included in the host server 110 and each illustrated component.

The network interface 1202 can be a networking module that enables the host server 110 to mediate data in a network with an entity that is external to the host server 110, through any known and/or convenient communications protocol supported by the host and the external entity. The network interface 402 can communicate with one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

The collaborator management module 1208 manages information regarding the users of the collaborator platform. It may maintain each user's basic information. It may also organize the users by folder or by note, to keep track of the list of collaborators for each workspace or each work item, for example. The concurrent access module 1204 manages the communication among the users of the collaboration platform. For example, it may keep track of which user is editing which note at any given time and allow the collaborators of one note to edit the note at the same time. In one implementation, it automatically resolves any conflicts between the edits of different users. In another implementation, it enables an administrator or one or more of the collaborators to accept or reject the edits of different users and allows the collaborators to further edit the note afterwards.

The GUI module handles all aspects of GUIs, including creation and removal of GUIs. Specifically, the elements manager 1210 manages graphical elements in a GUI, such as buttons, text fields, drop-down lists, dialogs, etc., the text manager 1214 handles text elements in a GUI, the graphics manager 1216 handles graphics elements in a GUI, and the layout manager 1212 controls positioning of various elements in a GUI.

As used herein, a "module," "a manager," an "interface," and so on can be implemented by a general purpose, dedicated or shared processor, or, typically, firmware or software modules embodied in a computer-readable (storage) medium for execution by a processor. Depending upon implementation-specific or other considerations, the implementation can be centralized or distributed.

Figure 3:
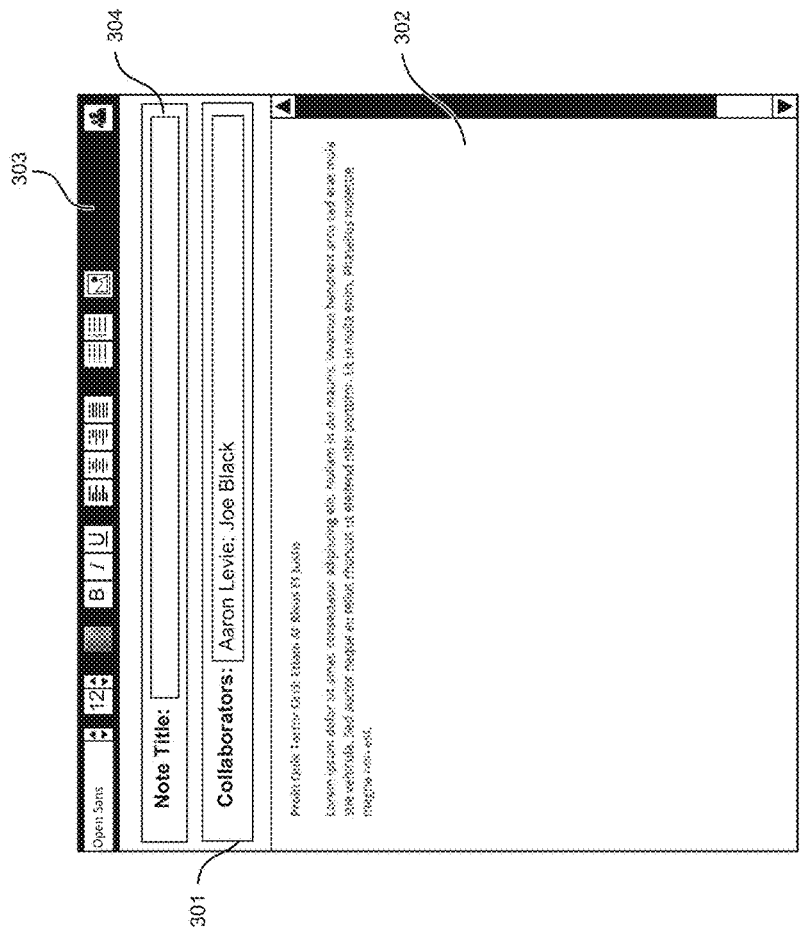
FIG. 3 contains a diagram illustrating example graphical user interfaces (GUIs) for creating a note.

FIGS. 3-10 illustrate example GUIs for users or collaborators to work with notes. FIG. 3 contains a diagram illustrating an example GUI for creating a note. In one embodiment, with a GUI for a notebook, a user requests the creation of a note. In response, the GUI module 1206 presents a new GUI for a note. In the new GUI, there can be four graphical elements: one for entering the list of collaborators, such as a text field 301, one for entering the title, such as a text field 304, one for providing the content, such as a multimedia field together with a scroll bar 302, and one offering a list of editing and formatting options, such as an inline toolbar 303. There can also be an additional graphical element for confirming the creation of the note, such as a submit button. In particular, the graphical element for entering the list of collaborators allows a user to specify the list of collaborators at the note level and during the creation of a note. The specification can be done manually or with the assistance of an existing directory through one or more of a text field, a drop-down list, a browse dialogue, and other graphical elements. In addition, the graphical element for providing the content permits the inclusion of different types of media into the content, including text, graphics, images, videos, and is amenable to various manipulations through the graphical element offering the list of editing and formatting options.

In one embodiment, the GUI for the note is displayed independent of the GUI for the notebook, such as in a separate tab. In another embodiment, once the note is created, as a result of pressing the submit button, for example, the GUI module 1206 stores the note and notifies each specified collaborator. For example, each collaborator may receive an email message with a hyperlink to the stored note.

Figure 4B:
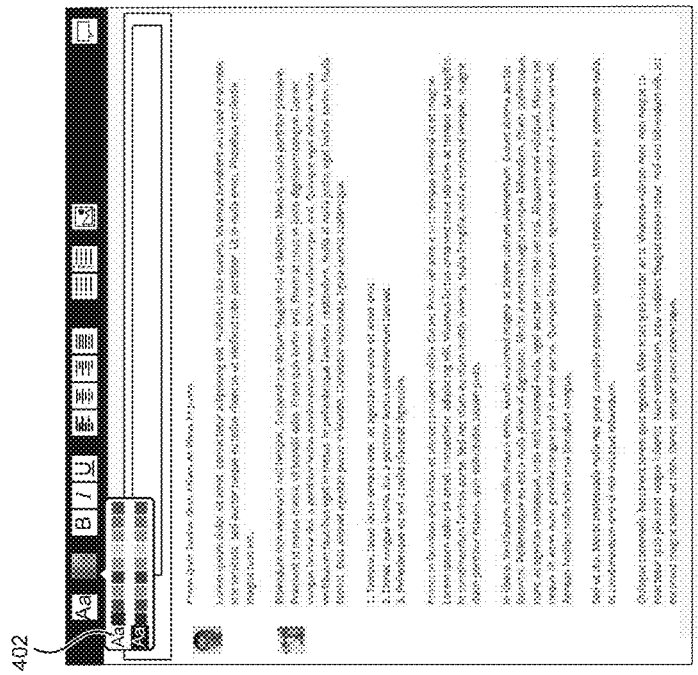
FIGS. 4A and 4B contain diagrams illustrating an example GUI for editing a note.
Figure 4A:
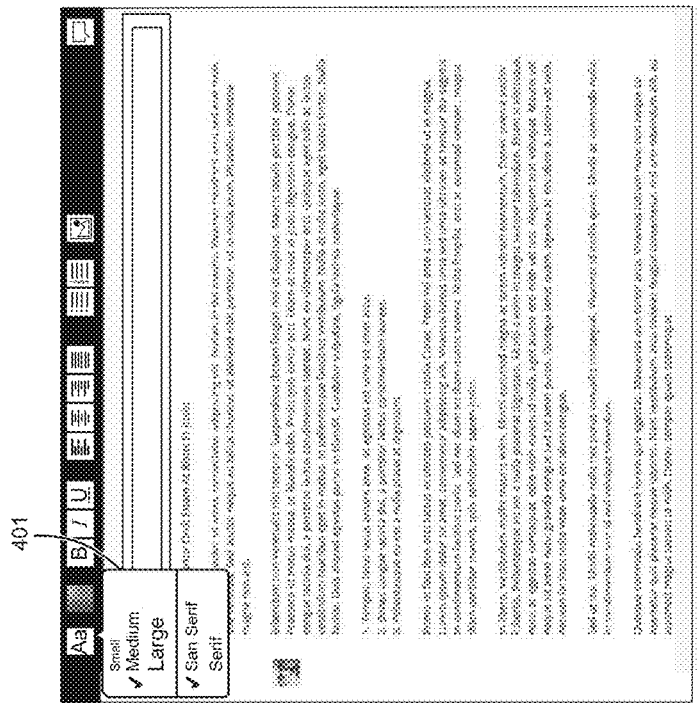

FIGS. 4A and 4B contain diagrams illustrating an example GUI for editing a note. In one embodiment, users can format the content of a note in the GUI for the note. The formatting may include changing the font size and style of any text or use different colors for the text, and can be done using one or more graphical elements, such as menus and buttons 401 and 402 within an inline toolbar. In another embodiment, users are also allowed to organize the content in various ways, in terms of alignment, indentation, listing, and so on.

Figure 5:
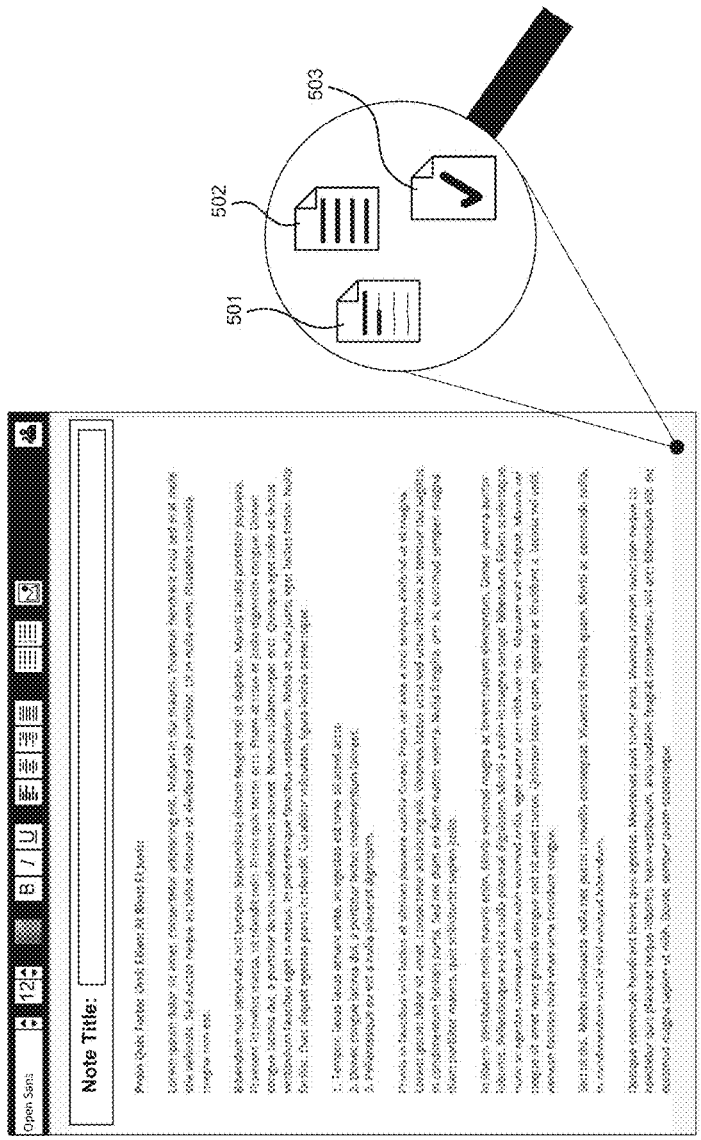
FIG. 5 contains a diagram illustrating an example GUI for saving a note.

FIG. 5 contains a diagram illustrating an example GUI concerning the saving of a note. In one embodiment, a user requests saving a note in the GUI for the note using a graphical element, such as a save button. In response to the user request or at certain predetermined intervals, the GUI module 1206 performs the save action, indicating the progress along the way. In one embodiment, the progress is shown through various icons 501 and 502 on one side of the graphical element for entering the content, in terms of the amount of content saved. When the saving is complete, the progress may be represented by a checkmark icon 503, for example. In another embodiment, the progress might be shown through icons of changing colors, degrees of brightness, and so on. It can also be shown through discrete signals, such as a ring at the beginning of a save action and two rings at the end. These features inform a user of the timing and status of saving of a note.

Figure 6:
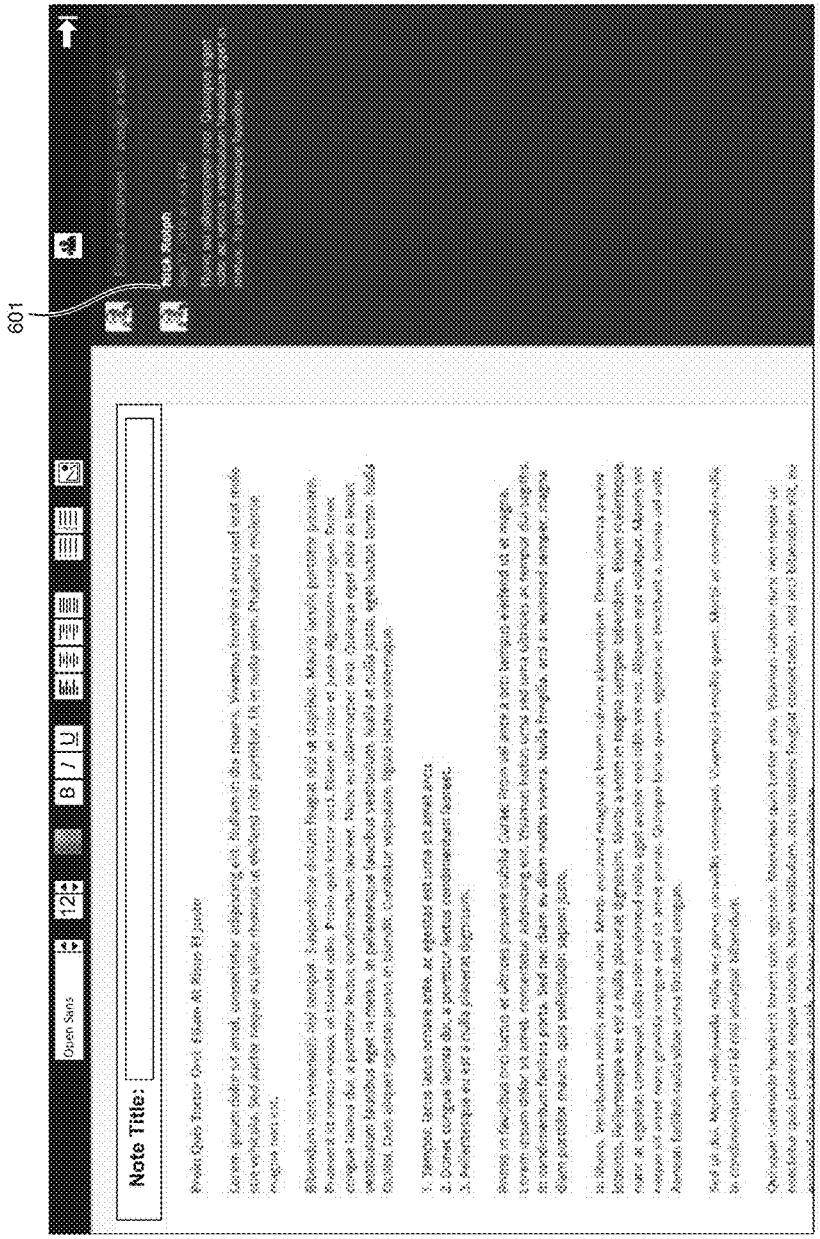
FIG. 6 contains a diagram illustrating an example GUI for commenting on a note.

FIG. 6 contains a diagram illustrating an example GUI for commenting on a note. In one embodiment, the user requests the creation of a comment in the GUI for the note using a graphical element, such as a create button. In response, the GUI module 1206 presents certain graphical elements, such as a text box for entering the comment and a submit button, near or overlaying the graphical element for entering the content. In one embodiment, once a comment is created, as a result of pressing the submit button, for example, the GUI module 1206 saves and displays the comment. As one example of displaying a comment and related information in 601, information about the author and the date of the comment are shown in addition to the text of the comment. As another example, a list of comments is presented by author, by date, etc. In other embodiments, the GUI module 1206 allows a user to modify a comment created by the user or respond to another's user's comment. For example, a user may request an update of his or her comment using various graphical elements, such as by right-clicking on the display of the comment and choosing an update option from a pop-up menu. In response, the GUI module 1206 may present one or more graphical elements for the user to revise the comment.

Figure 7A:
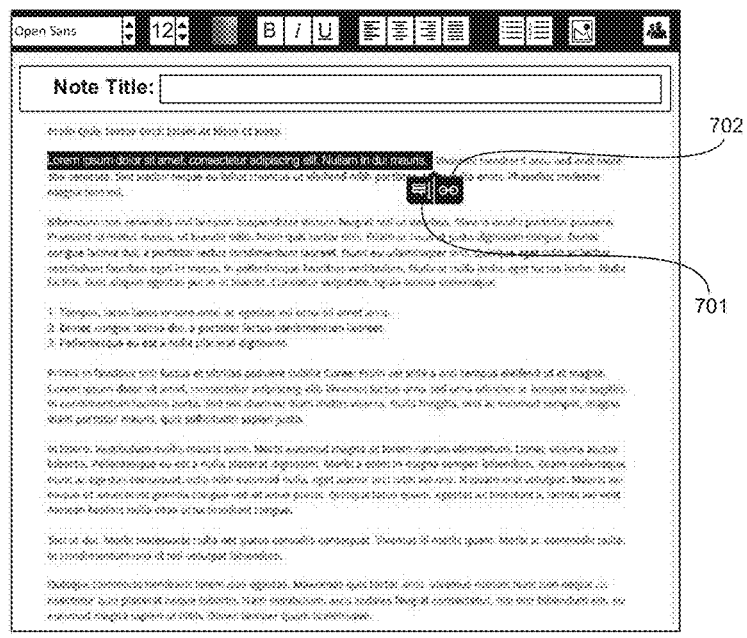
FIGS. 7A, 7B, 7C and 7D contain diagrams illustrating an example GUI for annotating a note.
Figure 7B:
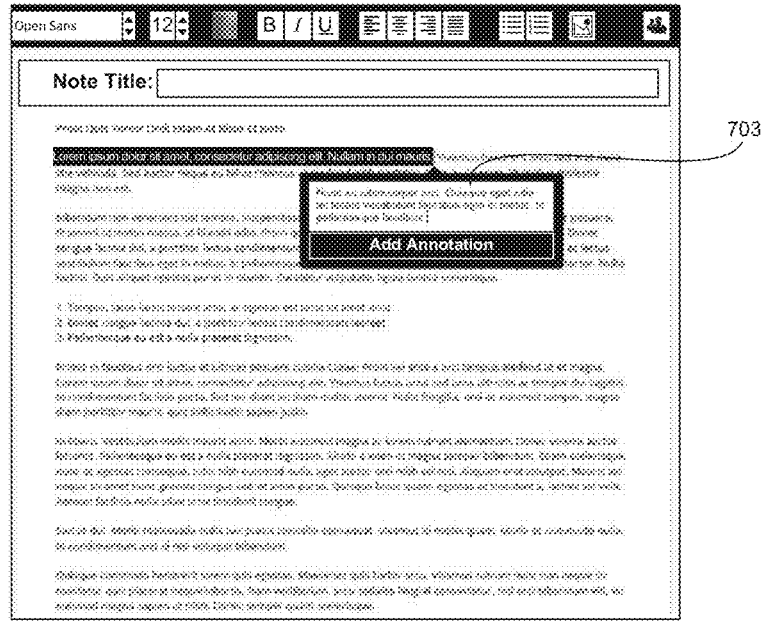

FIGS. 7A, 7B, 7C and 7D contain diagrams illustrating an example GUI for working with annotations of a note, which are similar to comments but can be tied to specific portions of the note. In one embodiment as illustrated in FIG. 7A, when a user selects a portion of the note in the GUI for the note, the GUI module 1206 allows the user to enter an annotation using a graphical element near the display of the selected portion and overlaying the display of some other portion, such as a button 701 or 702. In one embodiment, an annotation can be represented as a hyperlink, by text, and so on. When the user chooses a representation as a hyperlink, by pressing the button 702, for example, the GUI module 1206 can allow the user to enter and submit a URL or any other linkable address using one or more graphical elements. As illustrated in FIG. 7B, when the user chooses to represent the annotation by text, by pressing the button 701, for example, the GUI module 1206 can allow the user to enter and submit the text using one or more graphical elements near the display of the selected portion and overlaying the display of some other portion, such as a text field and a submit button 703.

Figure 7C:
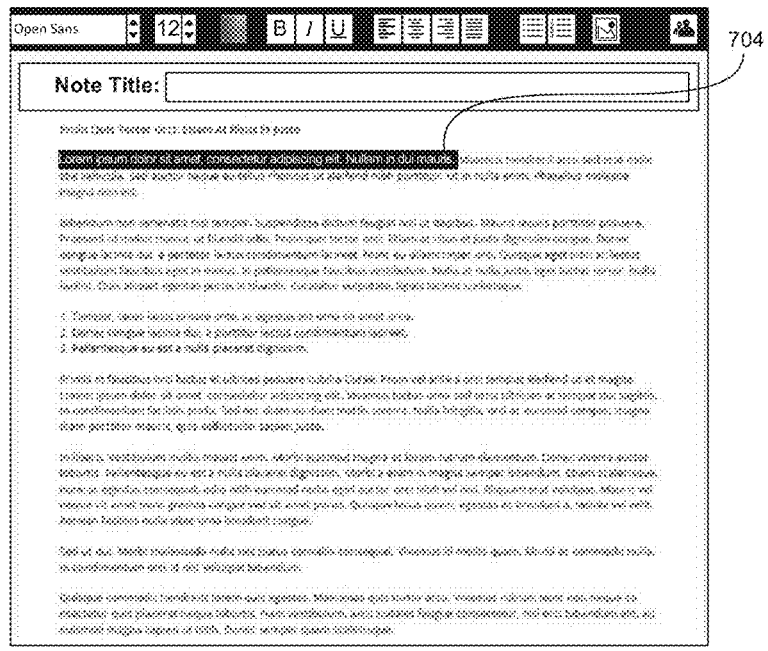
Figure 7D:
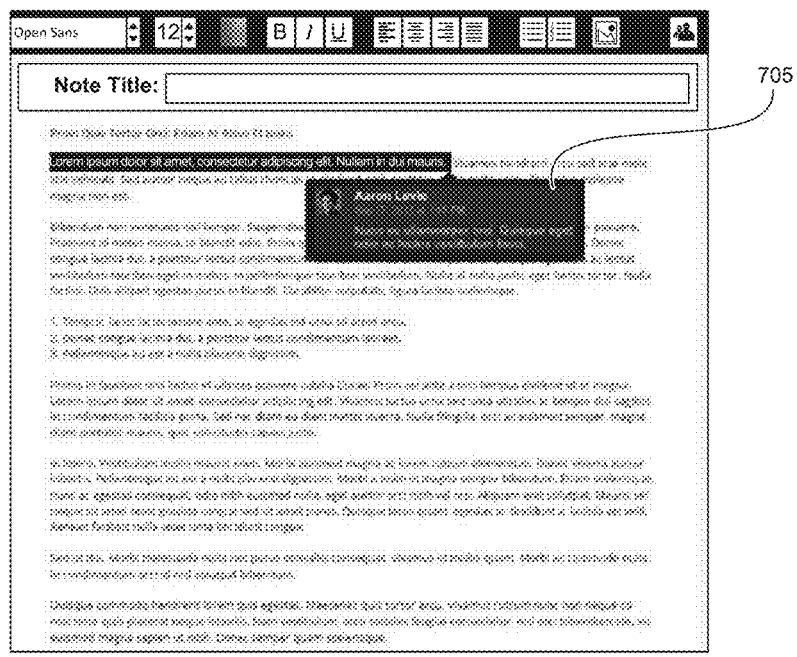

In one embodiment as illustrated in FIG. 7C, once an annotation is created, as a result of pressing a submit button, for example, the GUI module 1206 saves the annotation and displays the portion of the note that is associated with the annotation in a distinct way, such as in highlight 704, in bold, and so on, to inform the users of the existence of annotations for portions of the note. In another embodiment as illustrated in FIG. 7D, the GUI module 1206 displays the saved annotation upon user request. For example, when the user hovers over a highlighted portion of the note, information about the author and the date of an associated annotation are shown in addition to the annotation text overlaying the display of a portion of the note. In yet another embodiment, the GUI module 1206 shows all the annotations next to the graphical element for entering the note and moves the focus of the note to a portion of the note when an associated annotation is selected.

Figure 13:
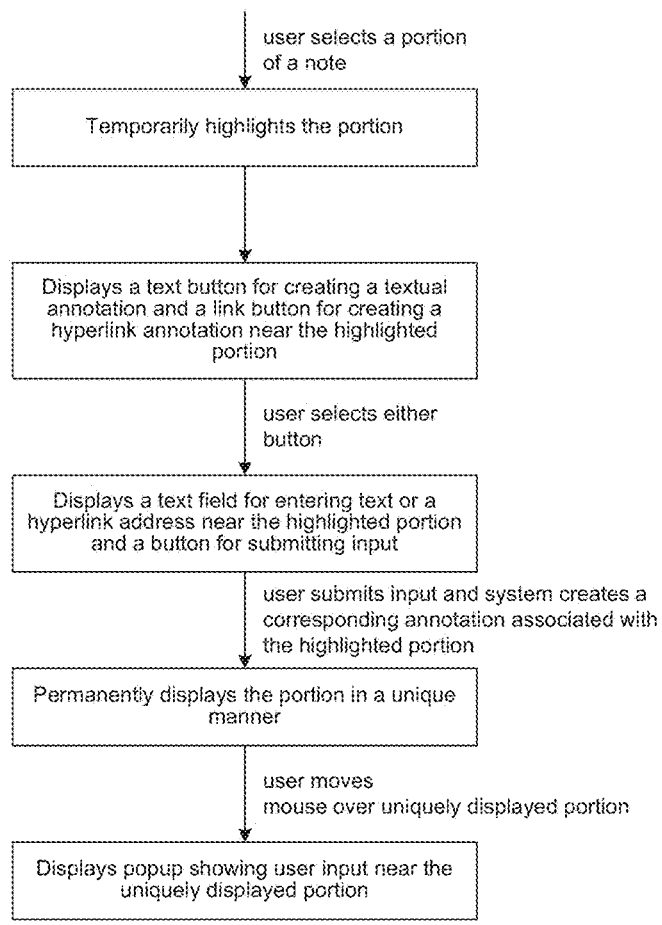
FIG. 13 contains a flowchart illustrating example operations performed by a GUI module in working with an annotation.

According to other embodiments, the GUI module 1206 allows a user to modify an annotation created by the user or respond to another's user's annotation. For example, a user may request an update of his or her annotation using various graphical elements, such as by right-clicking on the display of a portion of a note that is associated with an annotation and choosing an update option from a pop-up menu. In response, the GUI module 1206 may present one or more graphical elements for the user to revise the annotation. FIG. 13 contains a flowchart illustrating example operations performed by the GUI module 1206 in working with an annotation of a note.

Figure 8A:
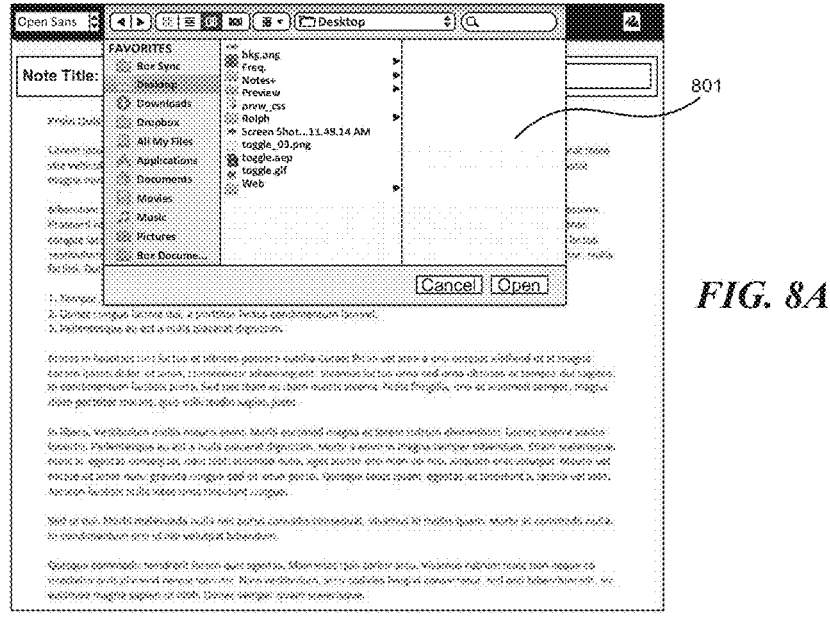
FIGS. 8A and 8B contain diagrams illustrating an example GUI for incorporating multimedia into a note.
Figure 8B:
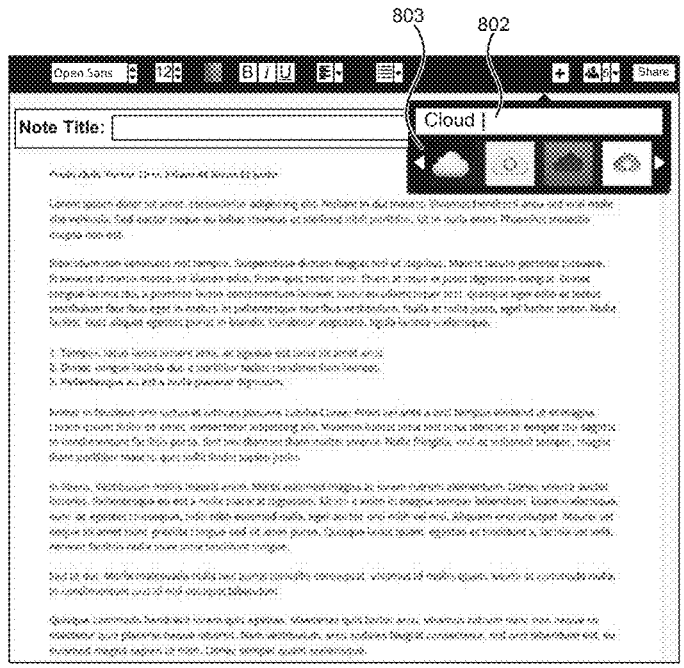
Figure 14:
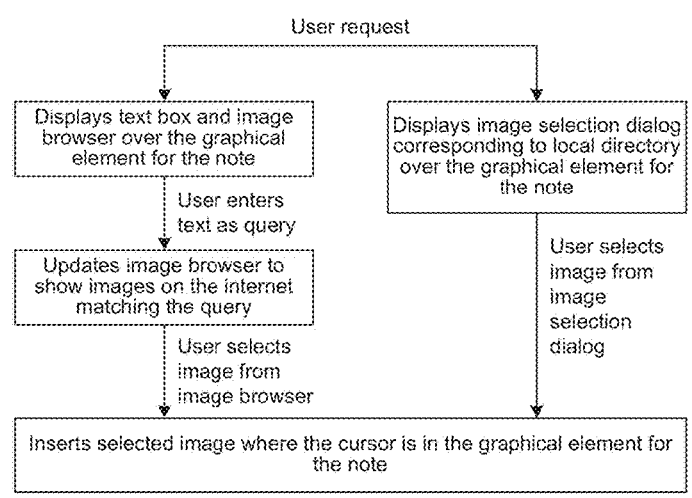
FIG. 14 contains a flowchart illustrating example operations performed by a GUI module in incorporating multimedia into a note.

FIGS. 8A and 8B contain diagrams illustrating an example GUI for incorporating multimedia into a note. In one embodiment, the user requests the insertion of multimedia, such as an image or a video, into the note in the GUI for the note using a graphical element, such as an insert button. In response, the GUI module 1206 presents a browsing dialog, overlying a portion of the note, for example, for the user to select one or more pieces of multimedia data. As illustrated in FIG. 8A, the GUI module 1206 may populate the browsing dialog 801 with a list of multimedia data from a local database. As illustrated in FIG. 8B, it may also allow a user to enter a query using a graphical element, such as a text field 802, run a search using any known technique against an external database, such as a remote server accessible through the internet, and populate the browsing dialog 803 with the list of search hits. The pieces of multimedia may be displayed in a browsing dialog by location, by search score, by type, and by other relevant criteria. The selected one or more pieces of multimedia are then inserted into a designated location within the note, such as the user's current focus position. FIG. 14 contains a flowchart illustrating example operations performed by the GUI module 1206 in incorporating multimedia into a note.

Figure 9:
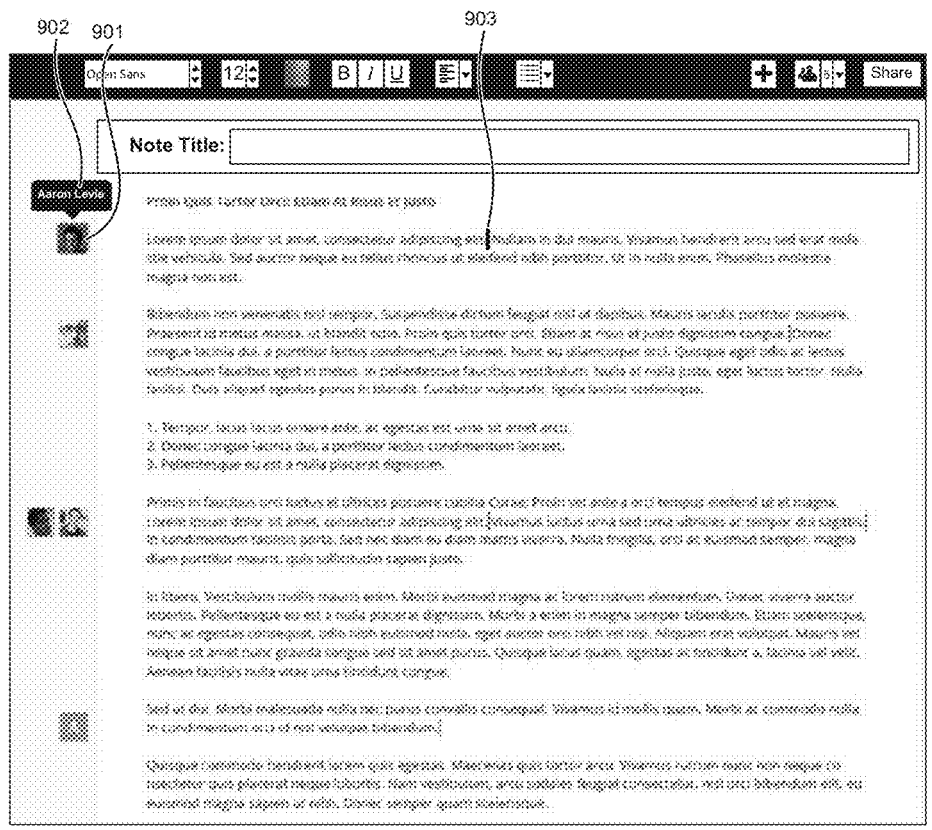
FIG. 9 contains a diagram illustrating an example GUI supporting multi-user collaboration on a note.

FIG. 9 contains a diagram illustrating an example GUI which facilitates multi-user collaboration on a note. As the GUI module 1206 allows more than one user to work on the same work item or specifically the same note at the same time, in one embodiment, it indicates which user is working on which portion of the note in the GUI for the note. Each user can be represented by several graphical elements, including a string and a thumbnail coupled with a color. According to one example, a thumbnail 901, which is a photo of a user enclosed in a frame of the color associated with the user, is shown together with a string 902, which is the name of the user, next to display of the portion of the note being edited by the user, and a cursor 903 of that color is shown at the current position of the user's editing.

The editing may include any update to the note, including the removal of content and the change of format, as well as the addition or removal of an annotation. In one embodiment, the string is not shown or the cursor is not blinking unless the user is actively editing the content, which can be measured by the number of keystrokes per second or other means. In another embodiment, according to the user's instruction, the photo is repeatedly flashed as a warning to other users against editing the same portion of the note. In addition, the display can be refreshed at different rates, such as every five minutes, every time a user performs a keystroke, etc.

Figure 10:
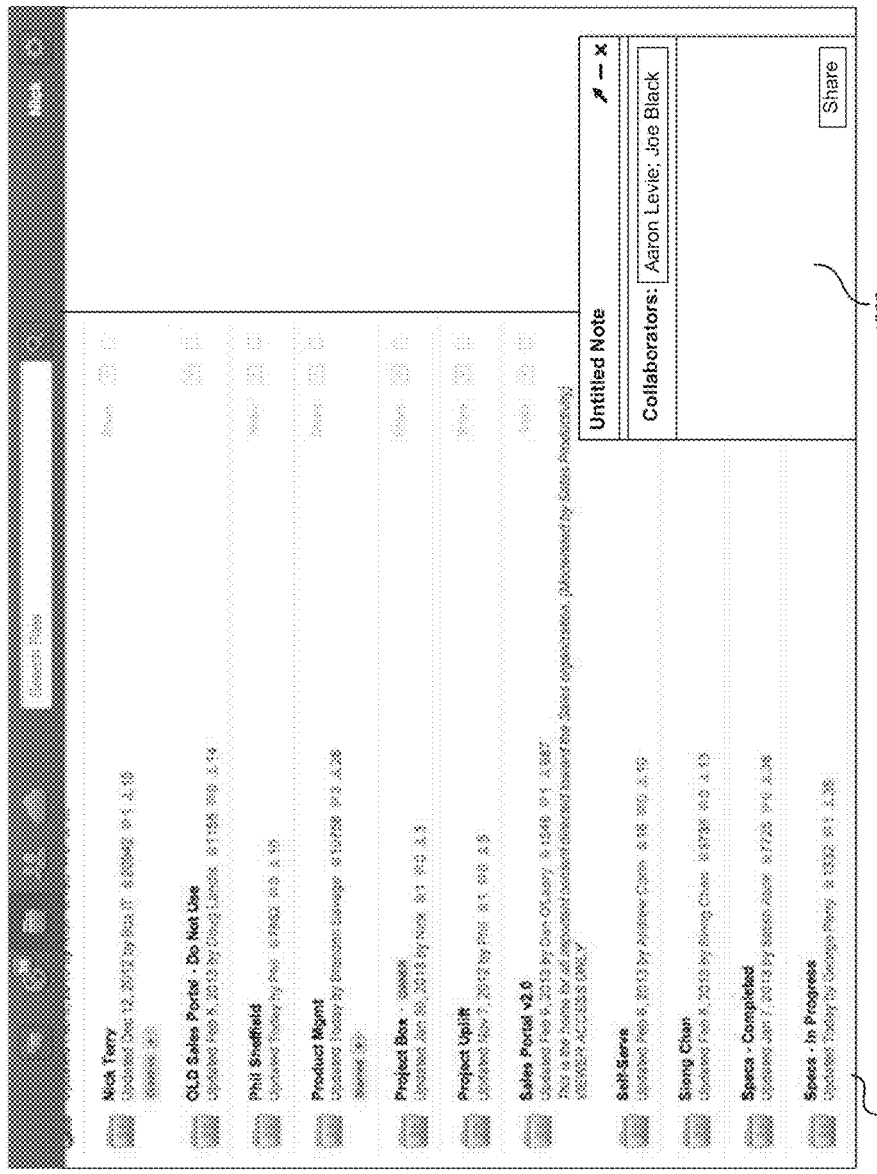
FIG. 10 contains a diagram illustrating example GUIs for quickly and conveniently creating a note from the web application to the cloud-based collaboration platform and sharing it with others/collaborators.

FIG. 10 contains a diagram illustrating example GUIs for quickly and conveniently creating a note from the web application and sharing it with others/collaborators. As discussed above with FIG. 3, with the GUI 1001 for a notebook, a user requests the creation of a note. In response, the GUI module 1206 presents a new GUI 1002 for a note. However, in one embodiment, the note is meant to be a "quick" one and thus the GUI 1002 is displayed in an easily-accessible manner, such as being overlaid on the interface 1001 from the web application to the cloud-based platform rather than in a separate tab. In one embodiment, the GUI 1002 does not support any manipulation of the note, including the organization of paragraphs in the note, the addition of comments on the note, and so on. Therefore, it does not include a graphical element offering the list of editing and formatting options, for example. This may be useful feature when a user wants to quickly share a task list with another user, for example. Once the note is created, however, it can be reopened, formatted and enriched and otherwise manipulated with the regular interface for a note.

Figure 11:
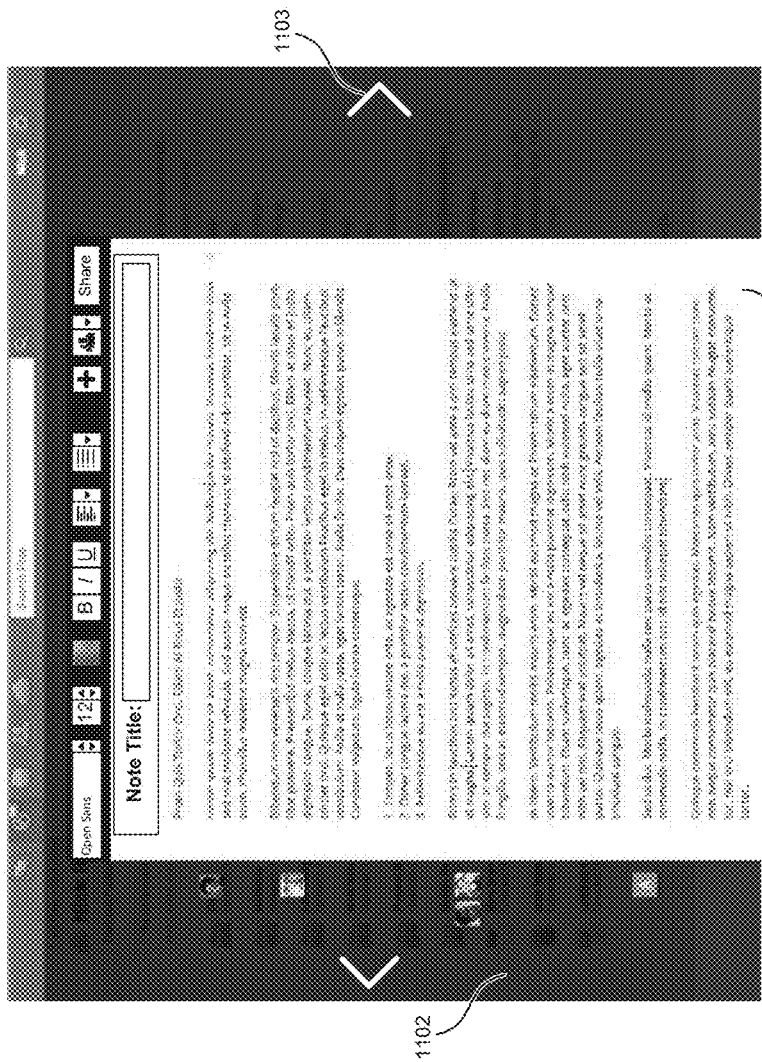
FIG. 11 contains a diagram illustrating example GUIs for viewing a note.

FIG. 11 contains a diagram illustrating example GUIs for viewing a note. In one embodiment, in working with a GUI 1102 for a notebook which contains one or more notes, a user requests the viewing of one of the notes using a graphical element, such as a menu obtained from right-clicking the listing of the note. In response, the GUI module 1206 displays a GUI 1101 for the note using the "lightbox" technique. Specifically, the GUI 1101, which includes a modal dialog, is displayed as the foreground while the GUI 1102 is displayed as the dark background, and user interaction with the GUI 1101 is required before control is returned to the interface 1002. In one embodiment, the GUI 1101 essentially contains a snapshot of the GUI illustrated in FIG. 9, allowing users to visualize the note and its current state of collaboration. In another embodiment, the GUI module 1206 shows the specified note in the GUI 1101 initially but allows a user to navigate through the notebook to view other notes via certain graphical elements, such as forward and backward navigation keys 1103.

Figure 15:
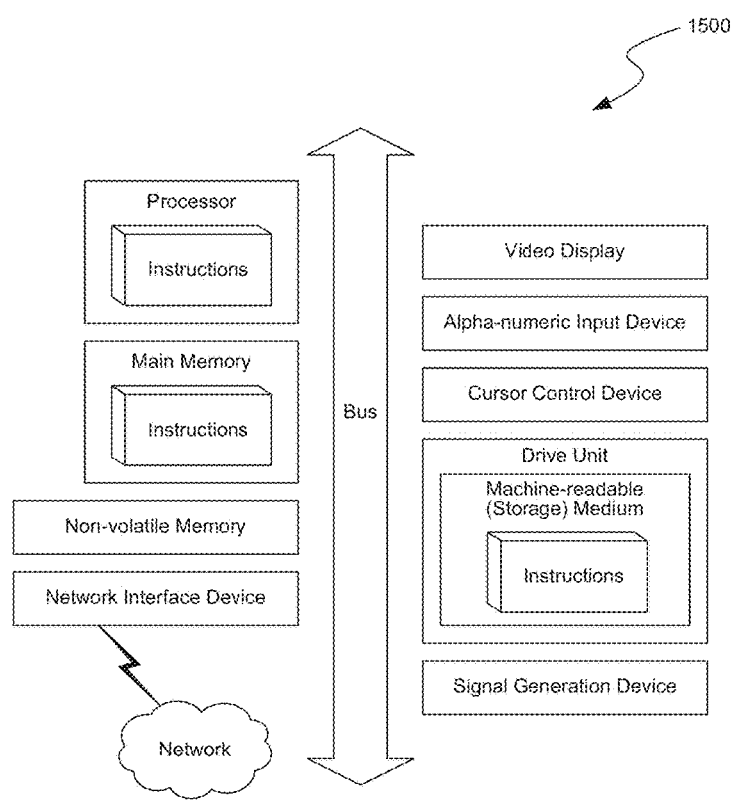
FIG. 15 is a block diagram illustrating an example machine representing the computer systemization of the development and communication environment.

FIG. 15 shows a diagrammatic representation 1500 of a machine in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects can likewise be embodied as a means-plus-function claim, or in other forms, such as being embodied in a computer-readable medium. (Any claim intended to be treated under 35 U.S.C. §112, ¶6 begins with the words "means for".) Accordingly, the applicant reserves the right to add additional claims after filing the application to pursue such additional claim forms for other aspects of the disclosure.

What is claimed is:

1. A method of providing collaborative access to content on a cloud-based collaboration platform, comprising:
   generating a first graphical user interface (GUI) displaying a folder including a plurality of previously created shared documents on a first screen, the previously created shared documents saved in one or more workspaces in the cloud-based collaboration platform and accessible concurrently by one or more collaborators, wherein the first GUI includes a graphical element for requesting creation of a new shared document to be saved in the cloud-based collaboration platform, wherein the new shared document is to be accessible concurrently by the one or more collaborators;
   receiving, by the graphical element, a request to create the new shared document;
   generating a second GUI for the new shared document, in response to receiving the request, the second GUI including
   a graphical element for building the new shared document and a graphical element for entering a list of selected collaborators of the new shared document;
   saving the new shared document at the cloud-based collaboration platform in response to detecting a request to save the new shared document;
   displaying, in the second GUI, a plurality of graphical elements in succession that show a progress of saving the new shared document at the cloud-based collaboration platform in response to detecting the request to save the new shared document;
   transmitting, via a computer network, a notification of the new shared document to computing devices of the selected collaborators in response to detecting the request to save the new shared document;
   generating a third GUI in response to detecting, via a fourth GUI, a request to access the saved new shared document, the fourth GUI including a display of a folder of previously saved shared documents including the saved new shared document, the third GUI including a display of the saved new shared document;
   displaying, in the third GUI, a graphical annotation generation element including an editable text field, in response to detecting a selection of a portion of the saved new shared document and detecting a request to add an annotation to the selected portion of the saved new shared document;
   saving annotation text entered via the editable text field;
   closing the graphical annotation generation element in response to saving the entered annotation text; and
   displaying, in the third GUI, a graphical annotation element adjacent to the selected portion of the saved new shared document and overlaying another portion of the saved new shared document, in response to detecting an interaction with the selected portion of the saved new shared document, the graphical annotation element including:
   the entered annotation text,
   a date the annotation text was entered, and
   an identification of a collaborator that entered the annotation text.

2. The method of claim 1, further comprising, for each collaborator, displaying in the third GUI at least one of:
   an identification of the collaborator at a position corresponding to a portion of the saved new shared document being edited by the collaborator, and
   a marker at a position corresponding to the current position of editing by the collaborator, wherein the marker has an appearance specific to the collaborator.

3. The method of claim 1, further comprising including in the second GUI one or more graphical elements for formatting the new shared document.

4. The method of claim 1, further comprising displaying, in the third GUI, a graphical element for requesting creation of a comment in the saved new shared document.

5. The method of claim 4, further comprising displaying, in the third GUI, comments created by one or more of the collaborators.

6. The method of claim 1, wherein the selected portion of the saved new shared document is displayed in a distinct format in response to the saving the entered annotation text.

7. The method of claim 1, wherein the plurality of graphical elements include a plurality of icons displayed in sequence to show a progress of saving the new shared document.

8. The method of claim 1, further comprising:
   providing access to the saved new shared document to a selected collaborator if they have the appropriate permissions for a particular workspace in which the new shared document is saved.

9. The method of claim 1, further comprising:
   detecting interaction with the saved new shared document by one or more of the selected collaborators; and
   in response to detecting the interaction, for each of the one or more selected collaborators, displaying in the third GUI, a dynamic marker at a position adjacent to a portion of the saved new shared document with which the collaborator is interacting such that the content of the saved new shared document is not visually obscured by the marker, and wherein the marker has an appearance specific to the collaborator, including an image of the collaborator.

* * * * *